May 3, 1927.
J. M. KELLEY ET AL
1,626,841
COLOR CHANGING ATTACHMENT FOR MOTION PICTURE PROJECTORS
Filed Sept. 23, 1926
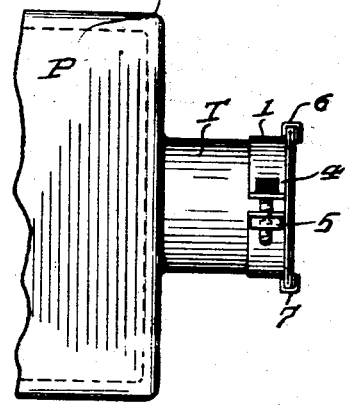
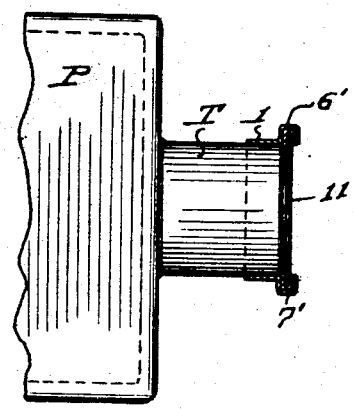
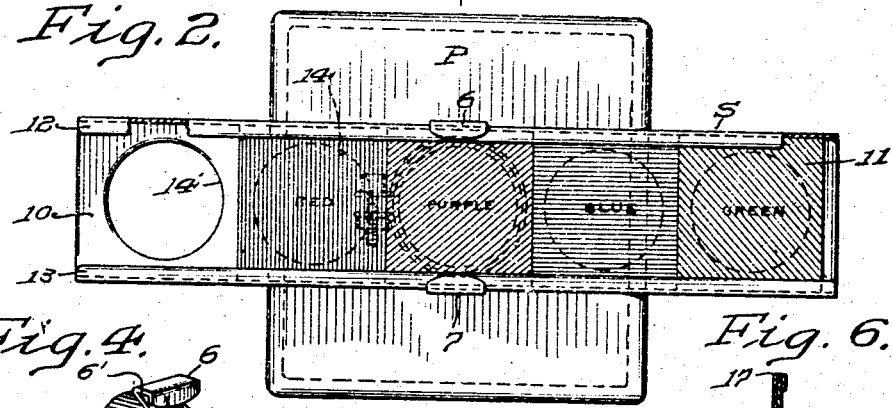
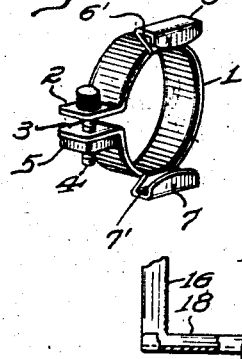
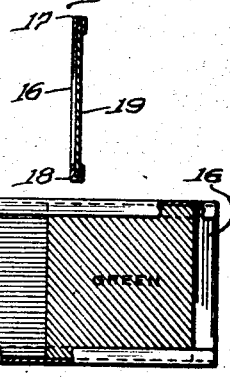
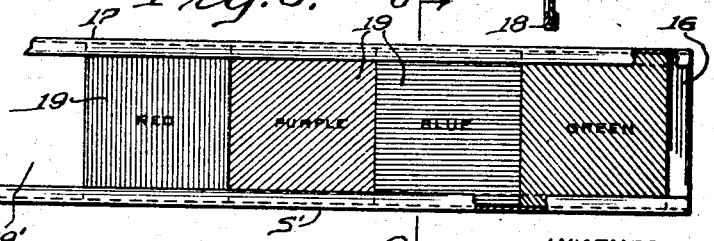
WITNESS
F. J. Hartman.
INVENTORS
James Maurice Kelley,
Joseph A. Hueber.
BY
ATTORNEYS Patented May 3, 1927.

1,626,841

UNITED STATES PATENT OFFICE.

JAMES MAURICE KELLEY AND JOSEPH A. HUEBER, OF PHILADELPHIA, PENNSYLVANIA.

COLOR-CHANGING ATTACHMENT FOR MOTION-PICTURE PROJECTORS.

Application filed September 23, 1926. Serial No. 137,198.

The present invention relates to projectors for moving picture films, a principal object of the invention being to provide a simple, cheap, yet efficient device for attachment to small portable projecting machines by means of which the projected pictures may be colored as desired when thrown upon the screen.

We are aware that various devices have been proposed for giving a variety of color effects to moving pictures by the interposition of color screens in the path of the projecting light beam but all of them, so far as we are aware, are of complicated design and intended for use with the larger forms of motion picture projectors such as are used in theaters and the like and are therefore not adapted by reason of their size, construction and relatively high cost for use by private individuals with the small portable projectors which are rapidly coming into general use for projecting films taken by amateurs with small hand cameras.

Our invention, on the other hand, contemplates the provision of a device which is peculiarly adapted for use with these small portable projectors to which it may be readily attached without in any way interfering with the portability or use of the projector or materially increasing its weight. The device in addition lends itself to economical manufacture, thereby enabling it to be sold at a popular price.

The invention further includes other objects, advantages and novel features of design, construction and arrangement hereinafter more particularly mentioned or which will be apparent from the following description of certain forms of the invention as illustrated in the accompanying drawing in which Fig. 1 is a side elevation of one of said forms in operative position on the lens tube of a motion picture projector, a portion of the body of which is also shown, and Fig. 2 is a front view thereof. Fig. 3 is a vertical section on line 3—3 in Fig. 2 looking in the direction of the arrows, the lens tube and projector body, however, being shown in elevation, and Fig. 4 is a perspective view of one of the elements of the device removed from the lens tube. In Fig. 5 we have shown in elevation a slightly different form of color screen from that shown in the preceding figures and in Fig. 6 a vertical section thereof on line 6—6 in Fig. 5. Like symbols are used to designate the same parts in the several figures.

The particular embodiment of the invention shown in Figs. 1 to 4 inclusive comprises a substantially annular collar or band 1 of suitable diameter to receive the outer end of the lens tube T of the projector P which, of course, may be of any suitable form and construction. This collar is preferably formed of a strip of relatively thin, preferably somewhat resilient sheet metal, the ends of the strip being bent outwardly away from the main, substantially circular portion of the collar and into substantially parallel relation with each other to provide a pair of spaced ears 2 and 3 which are respectively perforated for the passage of a clamping screw 4 having a milled head and provided with a nut 5 disposed beneath the ear 3. Preferably the nut is of sufficient size to jam against the adjacent curved portion of the collar so as to lock the nut against rotation when the screw is turned in adjusting the collar on the lens tube or removing it therefrom, thus relieving the operator from the necessity of holding the nut. By reason of the form of the collar and the slight resiliency of the metal from which it is made, the collar ordinarily tends to spring open slightly when the screw is backed off, thus enabling the collar to be readily slipped over the end of the lens tube and then snugly clamped thereon by drawing up on the screw, the position of the collar with relation to the tube being preferably so determined that the ears will extend substantially horizontally.

For operatively supporting the color screen hereinafter described, the collar is provided with a pair of lugs 6 and 7 consisting of integral enlargements of the collar and respectively positioned adjacent the forward edge of the collar at opposite ends of its vertical diameter and arranged to slightly overhang said edge. Conveniently, each of these lugs may be integral with the collar and so formed as to provide a transversely extending groove; these grooves are respectively designated as 6' and 7' and are oppositely disposed to each other so that the open side of groove 6' is directed downwardly and the open side of groove 7' upwardly when the collar is disposed on the lens tube, thus forming a sort of open channel which is bridged by the color screen when in operative position.

With the collar is operatively combined the color screen, generally designated as S, and which may consist of a strip 10 of sheet metal forming a backing for a plurality of panes or blocks 11 of suitable transparent or translucent material respectively of different colors as indicated arranged side by side, the particular colors, of course, being a matter of choice. While these panes of colored material may be of glass, we prefer to utilize gelatin or other substantially similar and more or less flexible material as it is lighter than glass and not as readily broken. The panes 11 may conveniently be rectangular in form and each of sufficient size to entirely overlie the end of the lens tube when positioned before it, and for holding the panes in the metallic backing strip 10 the longitudinal marginal edges 12 and 13 of the latter may be bent firmly over the corresponding edges of the panes, while the body of the backing may be provided with a series of spaced circular openings 14 respectively aligned with several panes, each opening being preferably of slightly greater diameter than the effective area of the lens tube; thus, when any of the openings is aligned with the tube that portion of the adjacent pane of colored material exposed through the opening will be interposed in the path of the projected light ray with no interference therewith from the metal portion of the screen. We also prefer to leave one of the openings, for example 14', entirely blank, that is, without any colored material adjacent thereto, so that when this opening is aligned with the lens tube the path of the projected ray will be entirely unobstructed. Conveniently this opening may be either of the end openings in the screen and its provision avoids the necessity of entirely removing the screen from the collar when it is desired to show the pictures without any colored effect.

In Figs. 5 and 6 we have shown a slightly different form of color screen S' which may be employed if desired. This screen, instead of being formed with a body portion or backing provided with a series of spaced openings, comprises in effect an open frame of sheet metal having end portions 16 of sufficient size to impart the requisite strength and longitudinally extending marginal portions 17 and 18 whose edges are bent inwardly over the adjacent edges of a series of rectangular panes of colored material 19 as in the form of screen hitherto described so as to hold the panes securely in position. Preferably also a blank space 19' may be left at one end of the screen for the same purpose as the opening 14', this space being conveniently of the same width as the panes.

In use, the collar is clamped on the lens tube of the projector with its forward edge, that is, the edge adjacent the lugs 6 and 7, in substantial alignment with the corresponding end of the tube so that the lugs will overhang the end of the tube and together provide a channel adapted to receive the color screen and support the latter adjacent the end of the lens tube when the screen is slid endwise into the channel from either direction, the vertical width of the screen being, of course, so determined with relation to the space between the lugs that the overhanging portions of the latter will engage over the marginal edges of the screen and hold it securely yet slidably in position. Thus by sliding the screen transversely of the lens tube any of the apertures 14 (or any of the panes 19 in the form of screen shown in Figs. 5 and 6 if employed) may be brought into registry with the tube, thereby interposing the colored material in the path of the light ray and effecting a corresponding coloring of the projected images. If no coloring be desired the screen may be moved so as to bring the blank aperture 14' or space 19' into alignment with the tube, thus avoiding the necessity of entirely removing the screen from the collar; this is frequently of advantage as, for example, when it is desired to project a portion of a roll of film in black and white and other portions thereof in color, since if under these conditions it were necessary to entirely withdraw the screen from the collar when a color effect was not desired, it might be somewhat difficult in a darkened room to thereafter return the screen to operative position in the collar without shaking the projector or getting the hands into the path of the light beam. While we have shown the screen in Figs. 1 to 3 inclusive so disposed that the metallic backing 10 is adjacent the end of the lens tube, it will be understood that the screen may be reversed from this position if desired so as to bring the backing to the front and the fully exposed faces of the colored panes adjacent the end of the tube.

It will thus be apparent that we have provided a device of extreme simplicity which may be readily attached to the lens tube of the projector by an inexperienced person without the use of tools, and which when so attached may be readily operated to produce different colored effects as desired or to permit the picture to be shown in black and white without the necessity of removing any part of the device. It will of course be further apparent that the collar 1 may be left in permanent position on the tube if desired as it in no way interferes with the transportation or use of the projector, but it ordinarily will be found advantageous to entirely withdraw the color screen when carrying the projector about for material distances so as to avoid accidental bending or other injury to the projecting ends of the screen.

While we have herein described certain forms of our invention with considerable particularity we do not desire or intend to specifically limit ourselves thereto as minor changes in the design, construction and arrangement of the parts may be made if desired without departing from the spirit and scope of the invention as defined in the appended claim.

Having thus described our invention, we claim and desire to protect by Letters Patent of the United States:

A device of the class described comprising a collar formed of a strip of sheet metal having its ends turned outwardly to form relatively spaced ears, said strip being provided at spaced points with integral enlargements located at diametrically opposite points on the collar and shaped to form approximately U-shaped lugs having opposite grooves forming a channel, a screw extending through the ears and operative to contract the collar to enable the same to be clamped on the end of the lens tube of a motion picture projector, and a color screen comprising a sheet metal frame and a plurality of transparent panes of different colors adapted when the frame is seated in said channel to be respectively brought into registry with the lens tube by sliding the frame in said grooves transversely of the tube.

In witness whereof, we have hereunto set our hands this 21st day of September, 1926.

JAMES MAURICE KELLEY.
JOSEPH A. HUEBER.